Dec. 9, 1969     O. THOMAS     3,482,500
CONTROL MECHANISM FOR CAMERA OBJECTIVE OR PARTS THEREOF
Filed June 21, 1967

Inventor:
Otto Thomas

By Karl F. Ross
Attorney

… ...  …

United States Patent Office 3,482,500
Patented Dec. 9, 1969

3,482,500
CONTROL MECHANISM FOR CAMERA OBJECTIVE OR PARTS THEREOF
Otto Thomas, Bad Kreuznach, Germany, assignor to Jos. Schneider & Co. Optische Werke Kreuznach, Bad Kreuznach, Germany, a corporation of Germany
Filed June 21, 1967, Ser. No. 647,782
Claims priority, application Germany, July 16, 1966, Sch 39,273
Int. Cl. G03b 3/10, 3/00
U.S. Cl. 95—45                  9 Claims

ABSTRACT OF THE DISCLOSURE

Photographic or cinematographic camera with an axially movable lens mount in a housing, comprising two parallel rods extending at opposite sides of the optical axis near the inner periphery of the housing in engagement with respective projections of the lens mount. One of these projections is formed into a nut mating with a threaded portion of one rod which is rotatable from without, by means of a knurled wheel and/or via an electric motor. A similar rod may be used to control a diaphragm-setting ring, axially displaceable with the lens mount, through a pinion meshing with gear teeth on that ring.

---

My present invention relates to a photographic or cinematographic camera whose objective includes one or more lenses that are axially movable for focusing purposes or for the changing of the overall focal length.

Conventional means for axially shifting a lens support include camming sleeves or interally threaded focusing rings centered on the optical axis of the objective; these elements, on account of their large contact surfaces, generally require the use of lubricants which are affected by changes in temperature.

The principal object of this invention is to provide a more compact mechanism for the axial shifting of an objective component, with elimination of the need for lubrication.

A more particular object of this invention is to provide a mechanism of this type which can be used in conjunction with both manual and automatic means for adjusting the position of the controlled component.

It is also an object of my invention to provide, in association with an improved control mechanism of the type mentioned, compact means for adjusting a rotatable element entrained with the axially shiftable lens mount, specifically a diaphragm-setting ring forming part of the objective.

These objects are realized, pursuant to my present invention, by the provision of two or more parallel rods within the generally cylindrical objective housing, these rods extending in axial direction next to the inner periphery of the housing and serving for the guidance of an axially shiftable lens mount. One of the rods is rotatably journaled, preferably in oilless bearings, and has a threaded portion engaging a nut that is rigid with the movable lens mount. Advantageously, the rotatable rod and a nonrotatable rod are disposed at diametrically opposite locations for improved guidance. Another one of these guide rods may be also rotatable and provided with a pinion in mesh with an externally toothed diaphragm-control ring which is axially shiftable together with the lens mount.

To stabilize the movable objective assembly in a jam-proof manner, I prefer to provide two axially spaced points of contact between the lens mount and its guide rods, the separation of these points being about equal to the radial distance of the guide rods from the optical axis.

The points of contact may be on the peripheries of two axially spaced annular shoulders of the lens mount which are in sliding engagement with two or more rods and of which one also bears the aforementioned nut.

The rotatably journaled rod or rods may carry knurled wheels which project beyond the housing to facilitate manual adjustment; alternately, or in addition, they may also be coupled to an electric drive motor which is energizable, e.g. from a battery on the objective housing, via suitable switches for displacing the lens mount and/or the diaphragm in one direction or the other.

The invention will be described in greater detail with reference to the accompanying drawing in which.

Figure 1:
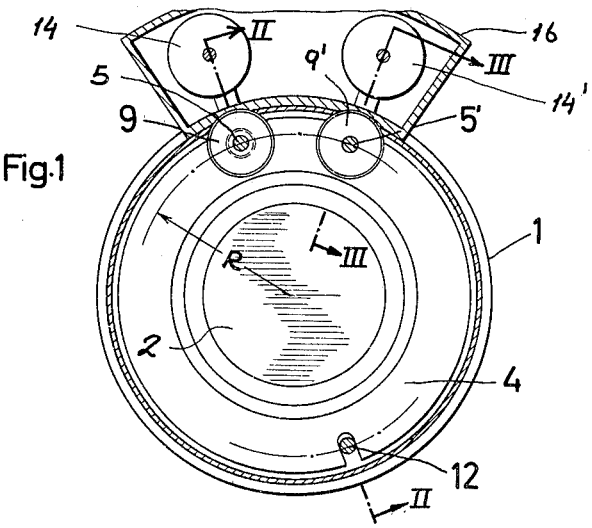
FIG. 1 is a cross-sectional view, taken on the line I—I of FIG. 2, of a camera objective embodying the present improvement.
Figure 2:
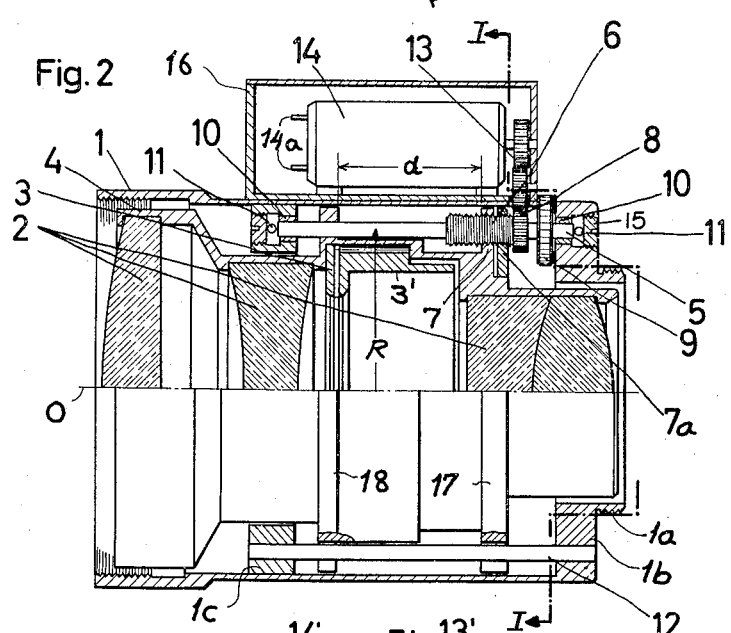
FIG. 2 is a longitudinal sectional view taken generally on the line II—II of FIG. 1.
Figure 3:
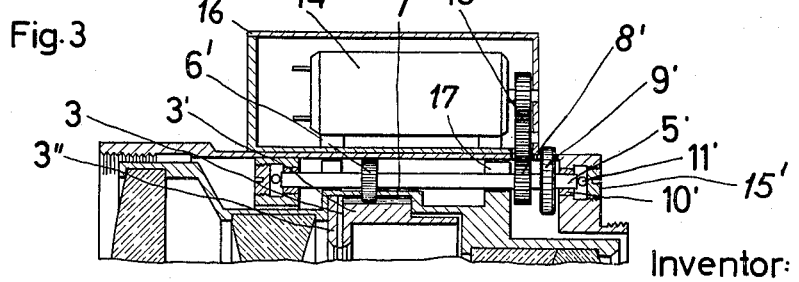
FIG. 3 is a fragmentary sectional view similar to FIG. 2 but taken on the line III—III of FIG. 1.

The objective illustrated in the drawing comprises a housing 1 having the usual thread coupling 1a by which it can be attached to a photographic or cinematographic camera not shown. A movable lens assembly 2 is supported in a barrel-type lens mount 4 centered on the housing axis O which is also the optical axis of the objective. Lens mount 4 further supports a conventional iris diaphragm 3 having a setting ring 3' whose rotation controls the size of its aperture.

Three axially extending guide rods 5, 5' and 12 are disposed inside the housing 1 near the inner periphery thereof. Rod 12 is fixedly held in the rear wall 1b of the housing and in a forward shoulder 1c thereof. Rods 5 and 5' are journaled in the same housing portions by means of oilless bearings (e.g. of sintered bronze) 10, 10' and are also under axial pressure from thrust bearings 11, 11' in the form of balls held in position by threaded plugs 15, 15'.

Rod 5 has an enlarged portion 6 provided with male threads in mating engagement with a nut 7, formed as a rigid extension of lens mount 4. In order to allow for a substantial elimination of the play of the mating threads, a portion 7a is split off and may be axially adjusted by means of screws or the like (not shown). There is further keyed to rod 5 a pinion 8 which, via a gear train 13, couples the rod to an electric motor 14 for rotation thereby. Motor 14 has terminals 14a by which it may be connected to a battery through a suitable switching circuit, e.g. of the type disclosed in commonly owned U.S. Patent No. 3,165,044 to Paul Himmelsbach. In addition, a knurled wheel 9 sits on the rod 5 and projects beyond housing 1 to allow for the manual adjustment of the axial position of lens assembly 2, e.g. during focusing upon a ground-glass plate or through a reflex viewfinder.

Rod 5' carries a pinion 6' which meshes, throughout the range of axial displacement of lens mount 4, with gear teeth on diaphragm control ring 3'. Like rod 5, rod 5' may be rotated either manually via a projecting knurled wheel 9', or by means of a motor 14' through a transmission including a pinion 8' and a gear train 13'. Motors 14 and 14' are accommodated in an extension 16 of housing 1 which may also contain their power source. A portion of ring 3', bearing scale markings to indicate different diaphragm stops, may be visible through a window (not shown) of housing 1.

Nut 6 forms part of an annular shoulder 17 of lens mount 4 slidably engaging the rods 5' and 12. The three rods 5, 5', 12 are also in sliding engagement with a second shoulder 18 of the lens mount. The axial distance d between the two shoulders 17, 18 is substantially equal to the radial distance R of the rods from the axis O. For centering purposes, rod 5 passes through a closely fitting bore in shoulder 18; rod 5' and 12, on the other hand, merely lie in radial slits of the two shoulders.

Naturally, the motors 14, 14' could be replaced by a single motor alternately switchable to drive the two rods 5 and 5'. Also, the transmissions 8, 13 and 8', 13' could be omitted if the motor shafts were directly aligned with the respective rods. Furthermore, guide rod 12 could be eliminated if rod 5', with its drive means, were moved into a position approximately 180° away from rod 5.

I claim:

1. In a camera attachment having a generally cylindrical housing and a lens mount with axially spaced shoulders axially movable in said housing, the combination therewith of a set of axially extending rods disposed near the inner housing periphery in slidable engagement with said shoulders, a nut rigid with said lens mount carried by one of said shoulders, one of said rods having a threaded portion matingly engaging said nut, and mechanism for rotating said one of said rods, thereby axially displacing said lens mount.

2. The combination defined in claim 1 wherein the spacing between said shoulders substantially equals the distance of said rods from the housing axis.

3. The combination defined in claim 1 wherein another of said rods is disposed at a location substantially diametrically opposite said one of said rods.

4. In a camera attachment having a generally cylindrical housing and a lens mount axially movable in said housing, the combination therewith of a set of axially extending rods disposed near the inner housing periphery in guiding contact with said lens mount, a nut rigid with said lens mount, one of said rods having a threaded portion matingly engaging said nut, and mechanism for rotating said one of said rods, thereby axially displacing said lens mount; said lens mount carrying a diaphragm provided with a control ring, said rods including a second rod provided with a pinion thereon, said control ring having gear teeth meshing with said pinion throughout the range of axial displacement of said lens mount, said mechanism including means for rotating said second rod to adjust said diaphragm.

5. The combination defined in claim 4 wherein said one of said rods and said second rod are closely juxtaposed, said rods including a third rod remote from the first-mentioned rods.

6. In a camera attachment having a generally cylindrical housing and a lens mount axially movable in said housing, the combination therewith of a set of axially extending rods disposed near the inner housing periphery in guiding contact with said lens mount, a nut rigid with said lens mount, one of said rods having a threaded portion matingly engaging said nut, said housing being provided with oilless bearing means for said one of said rods, and mechanism for rotating said one of said rods, thereby axially displacing said lens mount.

7. The combination defined in claim 6 wherein said bearing means includes journal bearings for said rod and thrust bearings in endwise engagement therewith.

8. The combination defined in claim 6 wherein said mechanism includes an electric motor coupled with said one of said rods.

9. The combination defined in claim 6 wherein said mechanism includes a knurled wheel on said one of said rods projecting beyond said housing.

References Cited

UNITED STATES PATENTS 3,077,824   2/1963   Hutchins _____ 95—77.5
3,106,125   10/1963  Martin et al.

NORTON ANSHER, Primary Examiner

RICHARD L. MOSES, Assistant Examiner

U.S. Cl. X.R.

350—255; 352—140, 141